(12) United States Patent
V et al.

(10) Patent No.: US 11,113,087 B2
(45) Date of Patent: Sep. 7, 2021

(54) TECHNIQUES OF DISCOVERING VDI SYSTEMS AND SYNCHRONIZING OPERATION INFORMATION OF VDI SYSTEMS BY SENDING DISCOVERY MESSAGES AND INFORMATION MESSAGES

(71) Applicant: AMZETTA TECHNOLOGIES, LLC, Norcross, GA (US)

(72) Inventors: Caarthyk Mano Sundar V, Chennai (IN); Mohanapriya Gnanasekaran, Chennai (IN); Jayachandran Gnanasekaran, Duluth, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 478 days.

(21) Appl. No.: 15/647,982

(22) Filed: Jul. 12, 2017

(65) Prior Publication Data

US 2019/0018696 A1 Jan. 17, 2019

(51) Int. Cl.
| | |
|---|---|
| *G06F 9/455* | (2018.01) |
| *G06F 9/50* | (2006.01) |
| *G06F 9/451* | (2018.01) |
| *H04L 12/64* | (2006.01) |
| *G06F 21/62* | (2013.01) |
| *G06F 21/44* | (2013.01) |

(Continued)

(52) U.S. Cl.
CPC .......... *G06F 9/45558* (2013.01); *G06F 9/452* (2018.02); *G06F 9/5077* (2013.01); *G06F 16/00* (2019.01); *G06F 21/44* (2013.01); *G06F 21/62* (2013.01); *H04L 12/6418* (2013.01)

(58) Field of Classification Search
CPC ...... G06F 9/45558; G06F 21/44; G06F 9/452; G06F 9/5077; G06F 16/00; G06F 21/62; H04L 12/6418; H04L 2012/6443; H04L 67/10; H04L 67/02
See application file for complete search history.

(56) References Cited

U.S. PATENT DOCUMENTS

| | | | |
|---|---|---|---|
| 9,065,725 B1 * | 6/2015 | Nanda | H04L 43/04 |
| 9,639,379 B1 * | 5/2017 | Suit | G06F 9/45558 |
| 10,230,601 B1 * | 3/2019 | Qin | H04L 43/08 |

(Continued)

OTHER PUBLICATIONS

Micro Focus, ZENworks 2017 Discovery, Deplyment, and Retirement Reference, Dec. 2016, Micro Focus Software Inc.,(Year: 2016).*

*Primary Examiner* — Benjamin R Bruckart
*Assistant Examiner* — Akshay Doshi
(74) *Attorney, Agent, or Firm* — Locke Lord LLP; Tim Tingkang Xia, Esq.

(57) ABSTRACT

In an aspect of the disclosure, a method, a computer-readable medium, and an apparatus for managing a plurality of VDI systems are provided. The apparatus broadcasts or multicasts, at a first VDI system of the plurality of VDI systems, a message including a first key uniquely associated with the first VDI system and a first network locator for locating the first VDI system in a network. The apparatus further receives, from a second VDI system of the plurality of VDI systems, a web service request including the first key, a second key uniquely associated with the second VDI system, a second network locator for locating the first VDI system in the network, and operation information of the second VDI system.

17 Claims, 11 Drawing Sheets

(51) Int. Cl.
    *G06F 16/00*     (2019.01)
    *G06F 1/00*     (2006.01)

(56) References Cited

U.S. PATENT DOCUMENTS

| | | | |
|---|---|---|---|
| 2011/0004878 A1* | 1/2011 | Divoux | G06F 9/4856 718/1 |
| 2013/0275596 A1* | 10/2013 | Subramaniam | H04L 41/04 709/226 |
| 2015/0131661 A1* | 5/2015 | Curtis | H04L 12/4641 370/392 |
| 2015/0163192 A1* | 6/2015 | Jain | H04L 61/103 370/255 |
| 2015/0355924 A1* | 12/2015 | Holla | G06F 9/45558 718/1 |
| 2016/0105350 A1* | 4/2016 | Greifeneder | H04L 41/046 709/224 |
| 2016/0182284 A1* | 6/2016 | Ayanam | H04L 41/0806 709/222 |
| 2016/0269252 A1* | 9/2016 | Manuguri | H04L 41/5058 |
| 2017/0199755 A1* | 7/2017 | Voccio | G06F 9/461 |
| 2018/0097701 A1* | 4/2018 | Wu | H04L 43/10 |

\* cited by examiner (A)

(B)

TECHNIQUES OF DISCOVERING VDI SYSTEMS AND SYNCHRONIZING OPERATION INFORMATION OF VDI SYSTEMS BY SENDING DISCOVERY MESSAGES AND INFORMATION MESSAGES

BACKGROUND

Field

The present disclosure relates generally to networked computer systems, and more particularly, to techniques of managing multiple virtual desktop infrastructure (VDI) systems and synchronizing operation information of the VDI systems.

Background

The statements in this section merely provide background information related to the present disclosure and may not constitute prior art.

Computer virtualization is a technique that involves abstracting a physical computing machine platform into a virtual machine (VM) that is executed under the control of virtualization software running on a single hardware computing platform (also referred to herein as a "host system" or a "host computer"). A group of hardware computing platforms may be organized as a cluster to provide the hardware resources for virtual machines. In a server or data center that employs virtual machines, it is common to see hundreds, even thousands, of virtual machines running on multiple clusters of host systems.

For ease of deployment, software management, and hardware cost reduction reasons, virtual machines have been used to support virtual desktops for use in an organization in place of physical workstations. Further, VDI scaling is a feature that groups one or more similar VDI installations found in a network. Therefore, there is a need to manage grouped VDI systems in the network from a single user interface.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for managing a plurality of VDI systems are provided. The apparatus broadcasts or multicasts, at a first VDI system of the plurality of VDI systems, a message including a first key uniquely associated with the first VDI system and a first network locator for locating the first VDI system in a network. The apparatus further receives, from a second VDI system of the plurality of VDI systems, a web service request including the first key, a second key uniquely associated with the second VDI system, a second network locator for locating the first VDI system in the network, and operation information of the second VDI system.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
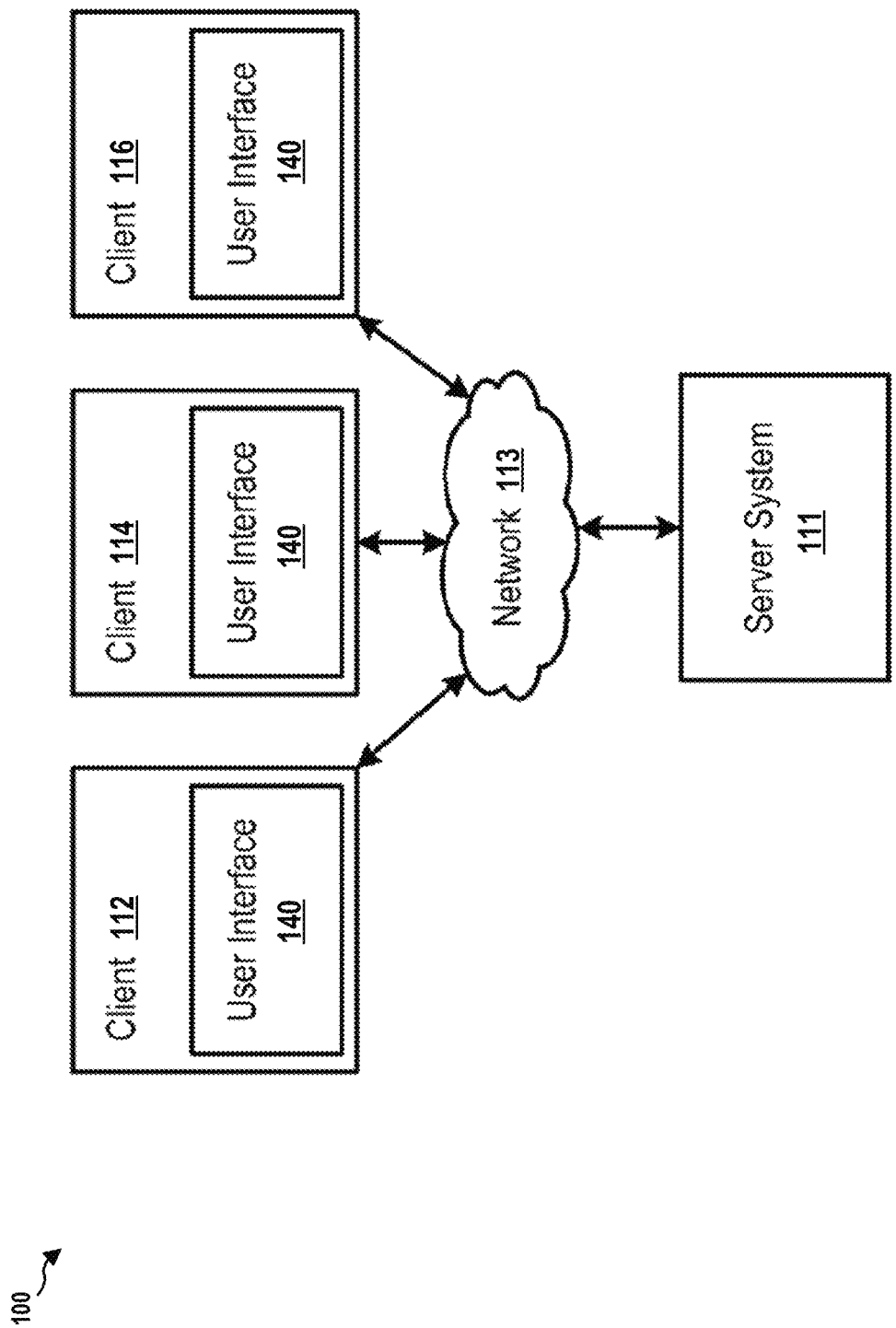
FIG. 1 illustrates a VDI system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

For ease of deployment, software management, and hardware cost reduction reasons, virtual machines have been used to support virtual desktops for use in an organization in place of physical workstations. Further, VDI scaling is a feature that groups one or more similar VDI installations found in a network. Therefore, there is a need to manage grouped VDI systems in the network from a single user interface.

FIG. 1 illustrates a virtual desktop infrastructure (VDI) system 100. The term, "desktop" refers to a human interface environment through which users can launch, interact with, and manage the user's applications, settings, and data. Traditionally, a desktop is presented by an operating system on a video display, and a user interacts with the desktop using a mouse and keyboard. Applications, documents, and other files may be displayed on the desktop and user input can be received by applications visible to the user on the display. The term "desktop" is also known to be used to refer to a physical computer system or "physical desktop" that might be placed on or near a user's desk, which is distinct from a "laptop" or "handheld," but as used herein, the term "desktop" by itself refers to the human interface environment described above, and not a physical computer system. Using computer virtualization, a user's computer system, including operating system settings, applications and application settings, and data may be transferred or copied as a virtual machine from one physical computer to another. When a virtual machine is copied in this way, the user can access his or her "desktop" from the physical computer system containing the original virtual machine, or the physical computer system containing the copy. The "desktop," therefore, is no longer tied to a particular physical computer system.

The VDI system 100 includes a VDI server system 111 in data communication over a network 113 with several VDI client systems 112, 114, and 116. The network 113 may be any configuration, such as a local area network (LAN), or private or publicly accessible wide area network (WAN), such as the Internet. It should be recognized that FIG. 1 shows a simplified representation of a typical VDI server system 111, which may include other components such as firewalls, connection brokers, and load balancers, as well as back-end storage networks, database servers, among others, as described in greater detail in FIG. 2. Each client system 112, 114, 116 may include a user interface 140 through which a user can interact with his or her desktop.

Figure 2:
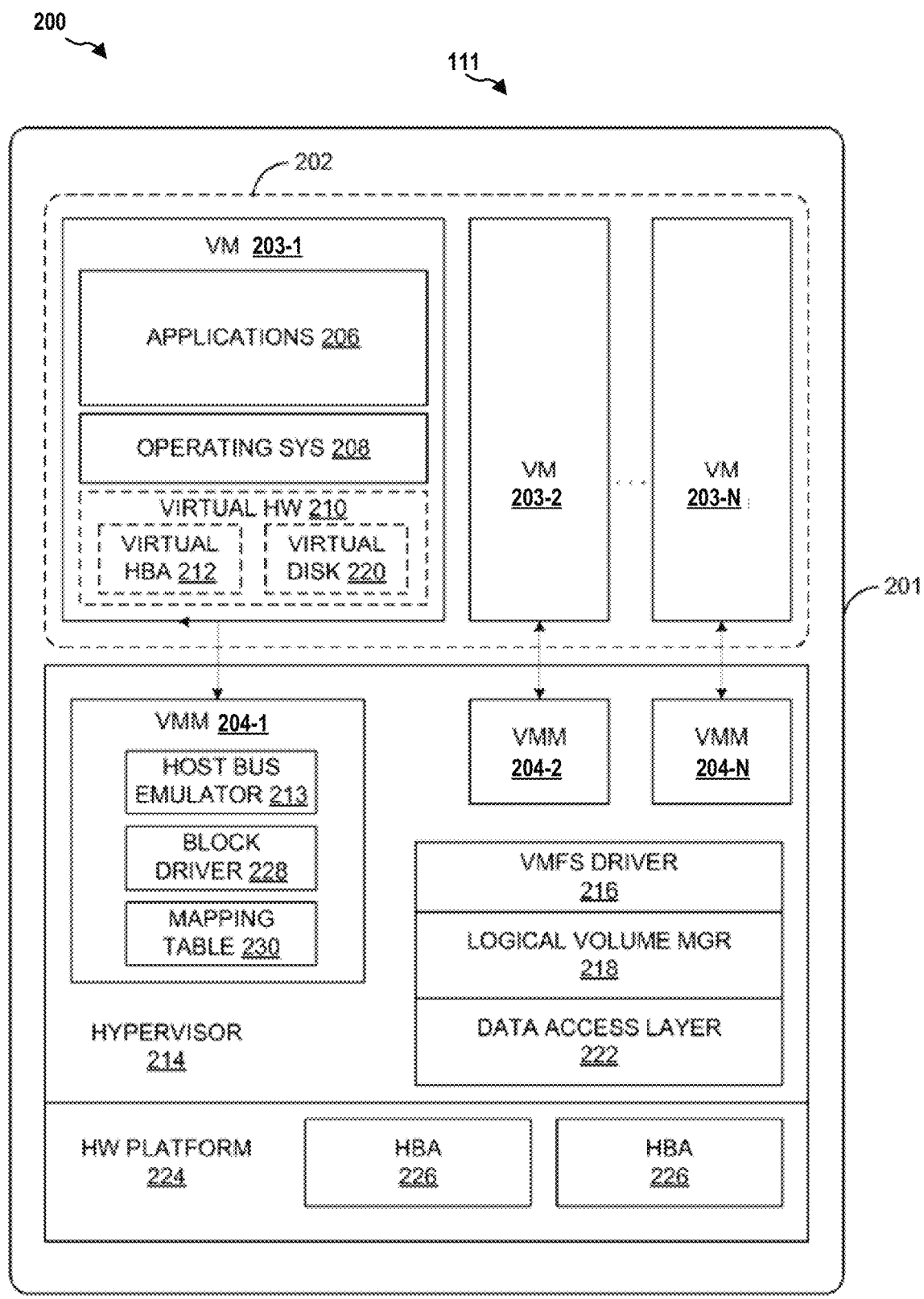
FIG. 2 is diagram illustrating a VM-based system.

FIG. 2 is diagram 200 illustrating the server system 111. The server system 111 includes an integral computer system 201 constructed on a hardware platform 224, including host bus adapters (HBAs) 226 in addition to a processor, memory, and other standard peripheral components (not separately shown). The hardware platform 224 executes a hypervisor 214 supporting a virtual machine execution space 202 within which virtual machines (VMs) 203-1 to 203-N are executed.

The hypervisor 214 provides services and support to enable concurrent execution of VMs 203-1 to 203-N. In turn, each of the VMs 203-1 to 203-N implements a virtual hardware platform 210 as a conceptual layer that supports the execution of a guest operating system 208 and one or more client applications 206 (which may be encapsulated in "application containers," as further discussed below). In certain configurations, the guest operating systems 208 are instances of MICROSOFT® WINDOWS®, LINUX®, etc. Other guest operating systems can be equivalently used. In each instance, a guest operating system 208 includes a native file system layer, typically either an NTFS (New Technology File System) or a ext3 (third extended) file system file system layer. These file system layer interface with the virtual hardware platforms 210 to access, from the perspective of guest operating systems 208, a data storage host bus adapter. In one implementation, virtual hardware platform 210 implements a virtual host bus adapter 212 and a virtual-disk 220 that emulate the necessary system hardware support to enable execution of the guest operating system 208 transparently to the virtualization of the system hardware.

File system calls initiated by guest operating system 208 to perform file system-related data transfer and control operations on virtual-disk 220 are processed and passed through the virtual host bus adapter 212 to adjunct a virtual machine monitor (VMM) 204-1 that implements the virtual system support necessary to coordinate operation with the hypervisor 214. In particular, a host bus emulator 213 functionally in the VMM 204-1 enables the data transfer and control operations to be ultimately passed to the host bus adapters 226. Further, the VMM 204-1 may also include a block driver 228 and accesses a mapping table 230 to assist VMM 204-1 in determining a storage location of data requested by the file system calls from guest operating system 208. For example, upon receiving a file system block level request to read data, the host bus emulator 213 may request the block driver 228 to determine whether the requested file blocks match an entry in mapping table 230. If mapping table 230 includes such an entry, then block driver 228 re-directs the file system block level request to a location specified in the entry of the mapping table 230 rather than allowing the file system block level request to be satisfied by a storage location of virtual-disk 220, itself, as would typically occur. In either case, file system calls for performing data transfer and control operations generated, for example, by applications 206 are translated and passed to a virtual machine file system (VMFS) driver or component 216 that manages access to files (e.g., virtual disks, etc.)

stored in data storage systems networked with the server system 111 that may be accessed by any of the VMs 203-1 to 203-N.

For example, a guest operating systems 208 can receive file system calls and perform corresponding command and data transfer operations against virtual disks, such as virtual SCSI (Small Computer System Interface) devices accessible through virtual HBA 212, that are visible to the guest operating systems 208 (e.g., as a virtual-disk 220, etc.). These virtual disks 220 are maintained as files stored on a VMFS, for example, in a storage system networked to the server system 111. Each such virtual-disk 220 may be maintained as a file or set of files stored on a VMFS, for example, in the networked storage system. Guest operating system 208 file system calls are translated from instructions applicable to virtual-disk 220, which is visible to the guest operating system 208, to instructions applicable to a file representing virtual-disk 220 in the networked storage system exposed by a storage system manager to the VMFS. Such translations are performed through a number of component layers of an IO (input/output) stack, beginning at the guest operating system 208 (which receives the file system calls from applications 206), through the virtual HBA 212, the host bus emulator 213, the block driver 228, the VMFS driver 216, a logical volume manager 218, which assists the VMFS driver 216 with mapping files stored in the VMFS with the storage system exposed by the storage system manager, a data access layer 222, including device drivers, and host bus adapters 226 (which, for example, issue a SCSI command to the storage system manager to access storage system).

It should be recognized that the various terms, layers, and categorizations used to describe the virtualization components in FIG. 2 may be referred to differently without departing from their functionality or the spirit or scope of embodiments described herein. For example, while the block driver 228 and the mapping table 230 have been depicted as part of the VMM 204-1, it should be recognized that alternative configurations may implement the block driver 228 as part of a different component of hypervisor 214. Furthermore, while one configuration may implement a mapping table 230 for each corresponding virtual-disk 220, alternative configurations may utilize a global mapping table that includes mappings for all virtual disks. Similarly, it should be recognized that while the VMs 203-1 to 203-N may be considered separate virtualization components between the VMs 203-1 to 203-N and the hypervisor 214 (which, in such a configuration, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative configuration, for example, the conceptual layer described as virtual hardware platform 210 may be merged with and into the VMMs 204-1 to 204-N such that the virtual host bus adapter 212 may be removed from FIG. 2, as its functionality is effectuated by the host bus adapter emulator 213.

At the hypervisor level, the block driver 228 monitors for block read requests that fall into the mapping table 230. If a block read request falls into one of the mappings in the mapping table 230, the hypervisor 214 redirects the block read request to an external data storage/source that stores the requested data and then passes the data back to the file system implementation requesting the data.

In certain configurations, applications 206 that are to be delivered via the virtual desktop are encapsulated in application containers. An application container is a data structure that captures an application in an OS-neutral format. In one implementation for generating such application containers, a standard operating system is scanned as a reference point. The scanning process scans the registry and the file system and generates a list of all the components that are present. Then, the application that is being captured into the application container is installed onto the standard operating system. The installation adds one or more files and makes one or more registry changes to the system. Once the application is completely installed, a post-installation scan of the system is performed and a second list is generated that includes the new additions to the system caused by the installation. Differences in the files and registry changes (and any other changes) between the pre-installation scan list and the post-installation scan list are determined. The resulting files (including an executable of the actual application itself) and registry entries are then stored in an "application container" that may further contain a runtime component and that is itself stored, for example, within a virtual disk of a user's virtual desktop, and that serves as the executable file for the application.

When the user launches the application container (e.g., from the file system of the guest OS of the virtual desktop), the runtime component of the application container executes the code of the application itself (which is embedded in the application container, as previously discussed) and intercepts and redirects any requests by the application code to access registry values and/or files back into the application container itself, to the extent such registry values and/or files were stored in application container, as previously discussed. Because applications captured in such OS-neutral application containers are self-contained, they can be updated (e.g., replaced with a new version of the application, etc.) in a virtual desktop image without interfering with other components of the virtual desktop, enabling such application containers in the virtual desktop to be updated more efficiently, as described in greater detail herein.

In certain configurations, the applications 206 are do not utilize application containers and are actually installed and copied to the file system of the guest OS of the virtual desktop run in the VM 203-1.

The respective virtual desktop run in each of the VMs 203-1 to 203-N includes an OS (operating system), which can be stored in an "OS store," and one or more applications, which can be stored in an "application store," for example, to be accessed by virtual desktops in the form of application containers.

In one configuration, the OS store and/or the application store are locations in networked storage accessible by the server system 111 that respectively store a number of OS images or application containers that can be selected by an administrator or other user when generating a virtual desktop (e.g., sometimes also referred to as a blob (binary large object) store).

In one example, the virtual desktop of the VM 203-1 may include metadata for use by the file system of virtual desktop (e.g., file descriptors of application containers accessible by the file system of the guest OS, etc.) that, for example, provide data block addresses of virtual-disk 220 that purportedly store the application data.

Further, the VMM 204-1 may include a mapping table 230 for the virtual desktop for use by the hypervisor 214 that maps the data block addresses that purportedly contain the application data in virtual-disk 220 to the actual location of data blocks of the application data of a networked storage system.

Figure 3:
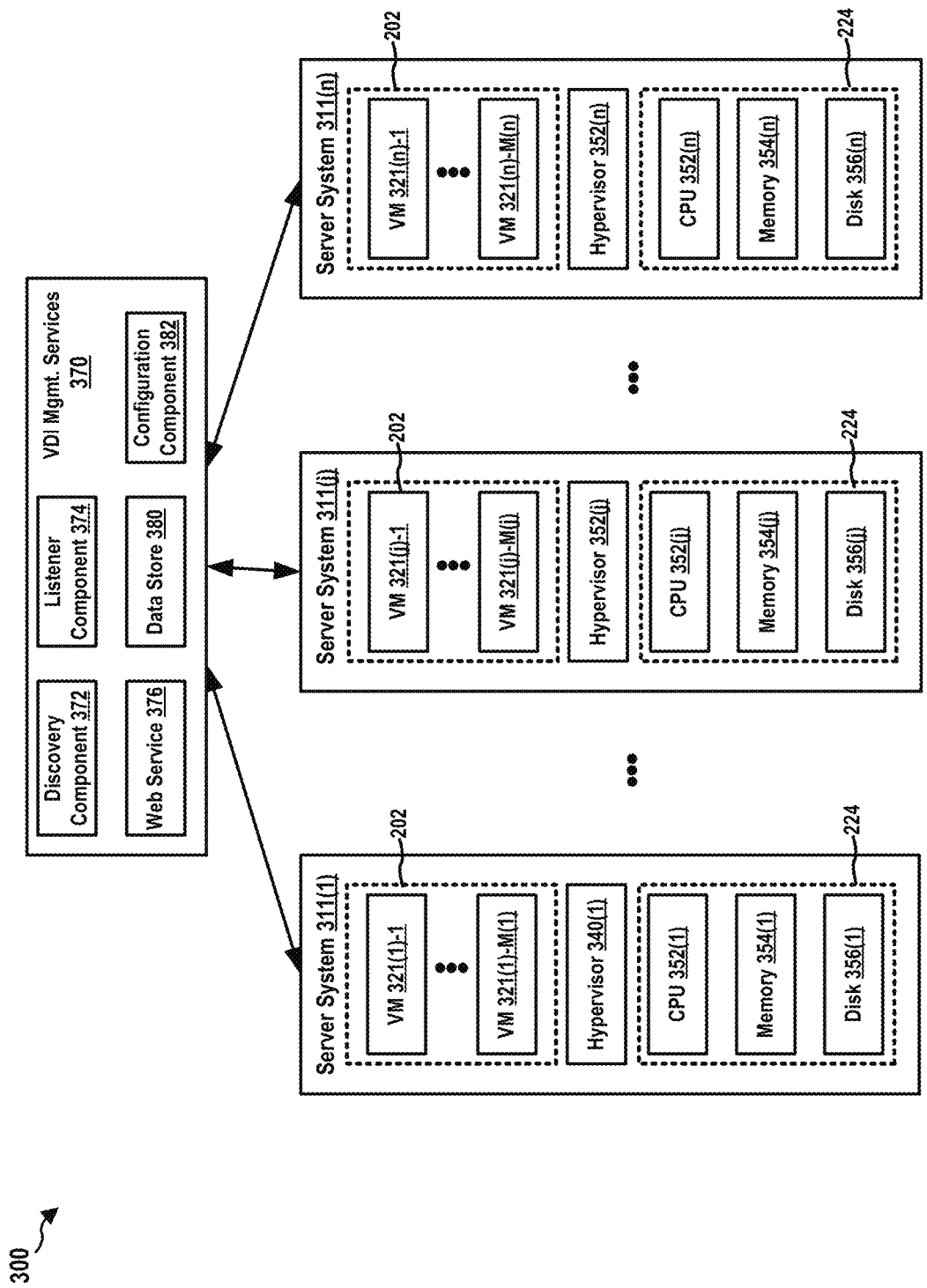
FIG. 3 is diagram illustrating server systems of the VDI system.

FIG. 3 is diagram 300 illustrating server systems 311(1) to 311(n) of the VDI system 100, n being an integer greater than 1. Each of the server systems 311(1) to 311(n) may be a system that is identical or similar to the server system 111.

Using the server system 311(1) as an example, the server system 311(1) includes a hardware platform 224 having a CPU 352(1), a memory 354(1), and a disk 356(1). A hypervisor 340(1) is running on the hardware platform 224 of the server system 311(1). Further, the hypervisor 340(1) provides a virtual machine execution space 202 that is currently executing VMs 321(1)-1 to 321(1)-M(1), M(1) being an integer greater than 0. Further, as shown, the server system 311(j) and the server system 311(n) each have hardware components and software components that are similar to those of the server system 311(1).

The VDI system 100 includes VDI management services module 304. The VDI management services module 304 may include a discovery component 372, a listener component 374, a web service 376, a data store 380, and a configuration component 382. The configuration component 382 may configure each of the server systems 311(1) to 311(n). For example, the configuration component 382 may configure the number of virtual machines to be initiated on a server when the server is booted.

The configuration component 382 of the VDI management services module 304 may monitor performance and operation of each of the server systems 311(1) to 311(n). In particular, the VDI management services module 304 may determine one or more load metrics of each of the server systems 311(1) to 311(n). Using the server system 311(1) as an example, the one or more load metrics may include the load of the CPU 352(1), which indicates the percentage of the computing power of the CPU 352(1) that is being used in a predetermined time period (e.g., from 1 minute ago to present). The one or more load metric may also include a usage rate of the memory 354(1), which indicates the percentage of the capacity of the memory 354(1) that is being used. The one or more load metric may also include an indicator of data read/write activities of the disk 356(1) in a predetermined time period (e.g., from 1 minute ago to present). For example, the indicator may indicate the amount of data read/write in the predetermined time period or the number/count of read/write operations in the predetermined time period. In addition, the number (i.e., M(1)) of VMs in the VMs 321(1)-1 to 321(1)-M(1) that are actively executed in the virtual machine execution space 202 may also be a load metric.

Figure 4:
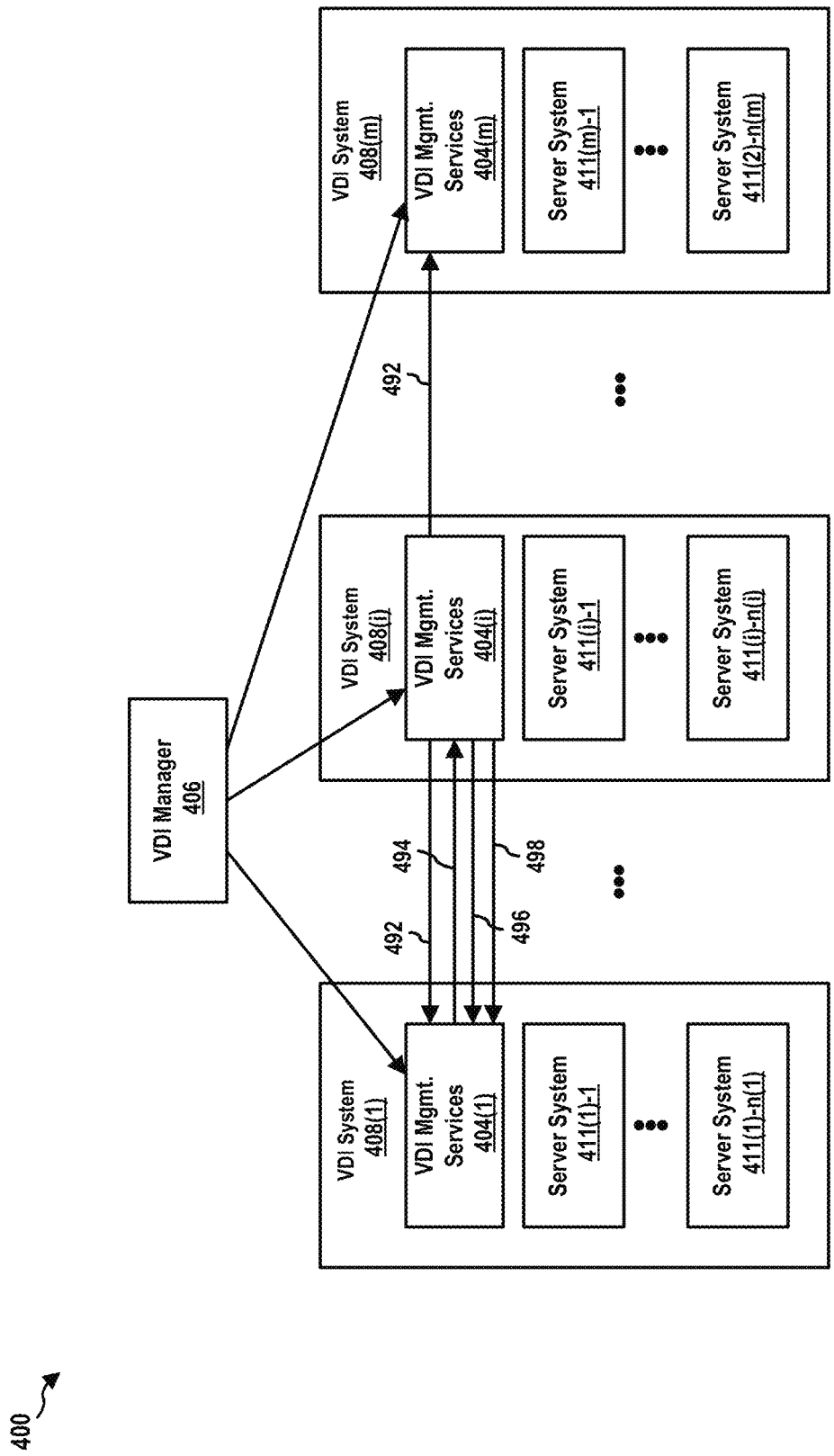
FIG. 4 is diagram illustrating multiple VDI systems.

FIG. 4 is diagram 400 illustrating VDI systems 408(1) ... 408(i) ... 408(m), i and m being an integer greater than 1, m being greater than or equal to i. Each of the VDI systems 408(1) ... 408(i) ... 408(m) may be a system that is identical or similar to the VDI system 100. Each of the VDI systems 408(1) ... 408(i) ... 408(m) includes a VDI management services module (similar to the VDI management services module 304) and multiple server systems (similar to the server systems 311(1) to 311(n)). In particular, the VDI system 408(1) includes a VDI management services module 404(1) and server systems 411(1)-1 to 411(1)-n(1), n(1) being an integer greater than 1; the VDI system 408(i) includes a VDI management services module 404(i) and server systems 411(i)-1 to 411(i)-n(i), n(i) being an integer greater than 1; the VDI system 408(m) includes a VDI management services module 404(m) and server systems 411(m)-1 to 411(m)-n(m), n(m) being an integer greater than 1.

A VDI manager 406 is in communication with the VDI management services module of each of the VDI systems 408(1) ... 408(i) ... 408(m) such as the VDI management services module 404(1), the VDI management services module 404(i), and the VDI management services module 404(m). As described infra, a user can use a user interface (UI) provided by the VDI manager 406 to manage the VDI systems 408(1) ... 408(i) ... 408(m). The user interface can also display operation information of the VDI systems 408(1) ... 408(i) ... 408(m).

Figure 5:
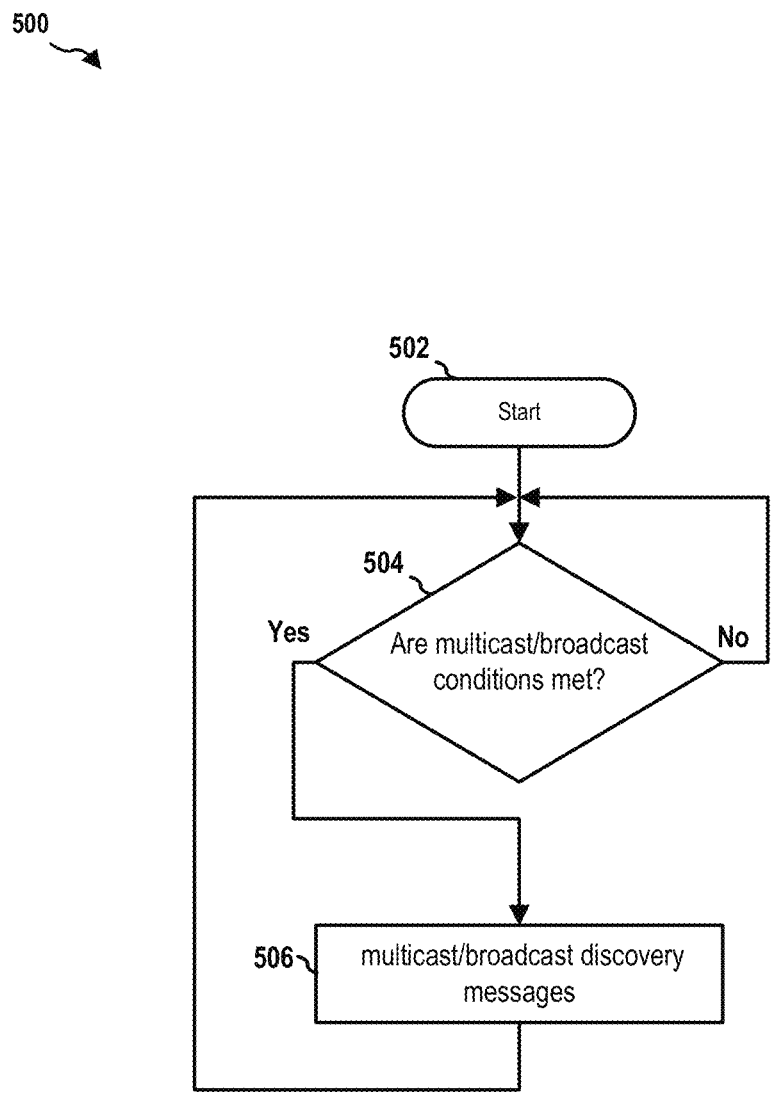
FIG. 5 is a flow chart of a method (process) for transmitting discovery messages.

FIG. 5 is a flow chart 500 of a method (process) for transmitting discovery messages, using the VDI system 408(i) as an example. The VDI management services module 404(i) has the same structure as the VDI management services module 304. Further, each of the VDI systems 408(1) ... 408(i) ... 408(m) is configured with a unique key and a host name. A host name may function as a network locator. Based on the host name of a particular VDI system, the network address of the VDI system may be determined, for example, through a Domain Name System (DNS). Based on the network address, the particular VDI system can be accessed.

When the VDI system 408(i) is powered on (or reset) and initialized, at operation 502, the discovery component 372 of the VDI management services module 404(i) starts a discovery process. In particular, the discovery component 372 constructs a discovery message containing the unique key and host name of the VDI system 408(i).

At operation 504, the discovery component 372 determines whether the multicast/broadcast conditions are met. For example, the conditions may be that the current time is within a predetermined time period after the VDI system 408(i) is initialized. In another example, the conditions may be that the following relationship ($2 \times interval^2 \le$ a predetermined time period) be satisfied. The predetermined time period may be 50 minutes. The interval is the time period between two consecutive multicast/broadcast the discovery messages.

In this example, when the multicast/broadcast conditions are not met, the discovery component 372 goes back to the beginning of operation 504. When the multicast/broadcast conditions are met, at operation 506, the discovery component 372 may multicast or broadcast discovery messages 492 (also referring to FIG. 4) according to a schedule. In one example, the discovery messages 492 may be multicast/broadcast every 0.5, 1, 2, or 3 minutes. In another example, when the following relationship ($2 \times interval^2 \le 50$) is satisfied, the discovery component 372 continues to multicast/broadcast the discovery messages 492. The discovery messages are multicast or broadcast at a particular port by the VDI systems 408(1) ... 408(i) ... 408(m). In this example, the port number may be 55800.

Similarly, the other VDI systems of the VDI systems 408(1) ... 408(i) ... 408(m), upon completing initialization or reboot, also multicast/broadcast discovery messages as described supra.

Figure 6:
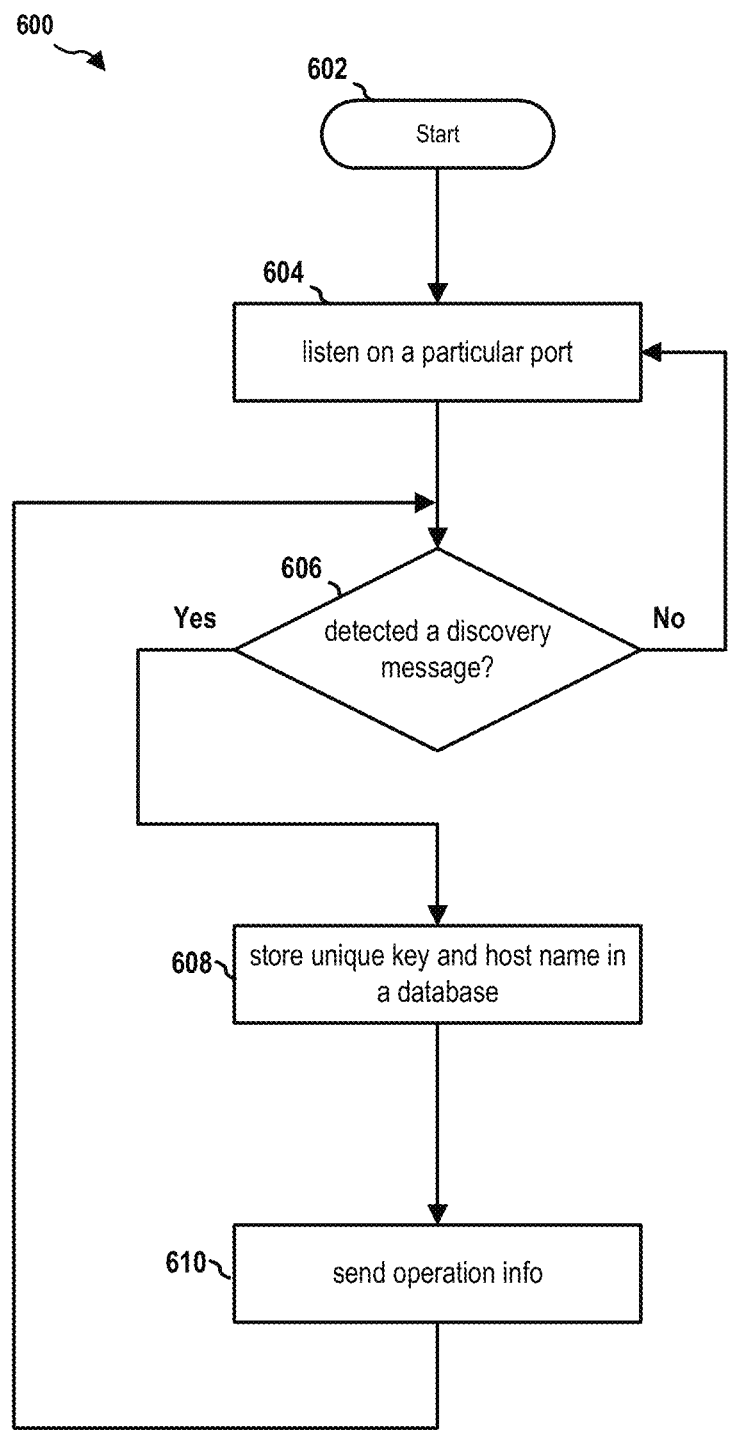
FIG. 6 is a flow chart of a method (process) for detecting discovery messages

FIG. 6 is a flow chart 600 of a method (process) for detecting discovery messages, using the VDI system 408(1) as an example. At operation 602, the listener component 374 of the VDI management services module 404(1) starts a detection process. At operation 604, the listener component 374 listens on the particular port that is employed by the VDI systems 408(1) ... 408(i) ... 408(m) for communicating discovery messages. In this example, the listener component 374 listens on port 55800.

At operation 606, the listener component 374 determines whether a discovery message has been detected. The discovery message may be sent from any other one of the VDI systems 408(1) ... 408(i) ... 408(m) by operations of that VDI system similar to the operations of the VDI system 408(i) described supra referring to FIG. 5. When the listener component 374 has not detected a discovery message, the listener component 374 goes back to operation 604.

When the listener component 374 detected a discovery message, at operation 608, the listener component 374 extracts the unique key and the associated host name from the discovery message. The listener component 374 then stores the unique key and the host name in the data store 380 of the VDI management services module 404(1). More specifically, the listener component 374 determines whether the extracted unique key has been stored in the data store 380 already. If the unique key is in the data store 380 already but is associated with a different host name, the listener component 374 updates that data entry with the host name just extracted. If the unique key is not found in the data store 380, the listener component 374 creates a new data entry in the data store 380, the data entry including the unique key and the host name. As such, the extracted unique key is associated with the extracted host name in the data store 380. In this example, the listener component 374 of the VDI system 408(1) detects the discovery message broadcast/multicast by the VDI system 408(i). The listener component 374 extracts the unique key and the host name of the VDI system 408(i) and then stores/updates the unique key and the host name in the data store 380 of the VDI system 408(1).

At operation 610, the listener component 374 collects the operation information of VDI system 408(1) from the configuration component 382. The operation information may include VM collection information, space available information, license information, and host name or display name information. More specifically, the operation information may specify all pools of virtual machines hosted by the VDI system 408(1) in pooled collections and the virtual machines in each pool. The operation information may specify the virtual machines in the personal collection of the VDI system 408(1). The operation information may specify the space used by pooled collections and by each pool in the collection. The operation information may also specify the space used by the personal collection. The operation information may specify the number of virtual machines that can still be created in the pooled collection. The operation information may specify the number of virtual machines that can be created in the personal collection. The operation information may also specify the number of licenses used by each collection and by each pool. The operation information may also include other information describing the VDI system 408(1).

Subsequently, the listener component 374 prepares an information message. The information message may be in the form of a web service request. The information message includes, as source unique key and host name, the unique key and the host name configured for the VDI system 408(1) (i.e., the listener) as described supra. Further, the information message also includes some or all of the operation information of the VDI system 408(1). The listener component 374 obtains the broadcaster's unique key and host name extracted from the discovery message just received. The listener component 374 further includes the broadcaster's unique key in the information message as a destination unique key to indicate that the listener component 374 has received the discovery message containing the unique key sent by the broadcaster. Based on the broadcaster's host name extracted from the discovery message, the listener can determine the network address of the broadcaster. The listener can send the information message to the broadcaster VDI system, using the network address. As described infra, the broadcaster VDI system may operate web services (e.g., the web service 376) that is configured to receive information messages at a particular port.

In this example, also referring the FIG. 4, the listener component 374 of the VDI management services module 404(1) receives the discovery messages 492 sent by the discovery component 372 of the VDI management services module 404(i). In response, the listener component 374 of the VDI management services module 404(1) sends an information message 494 to the web service 376 of the VDI management services module 404(i) on port 55200 (i.e., the particular port). After the listener component 374 sends the information messages, the listener component 374 goes back to operation 606.

Figure 7:
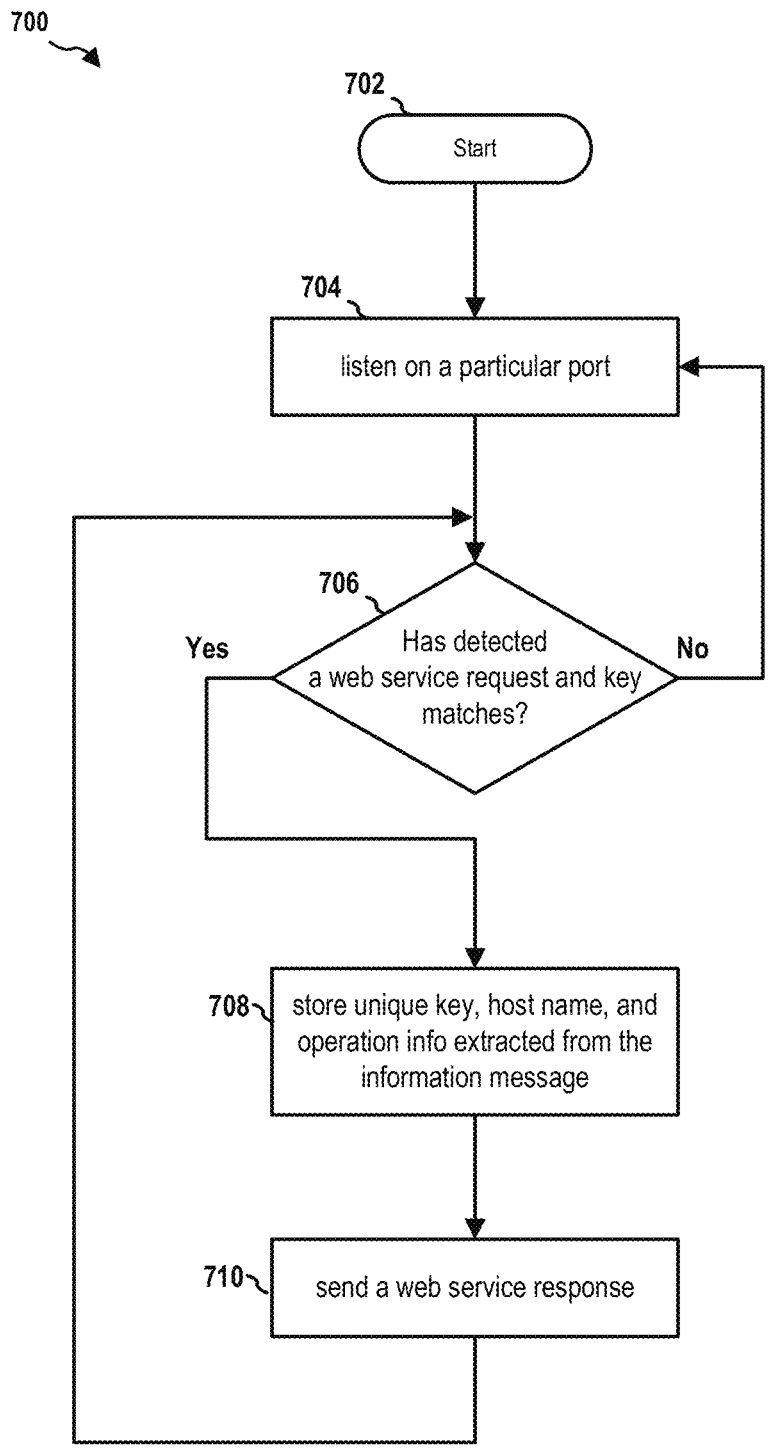
FIG. 7 is a flow chart of a method (process) for providing web services.

FIG. 7 is a flow chart 700 of a method (process) for providing web services, using the VDI system 408(i) as an example. In general, a web service is a service offered by an electronic device to another electronic device, communicating with each other via the World Wide Web. In a web service, web technology such as Hypertext Transfer Protocol (HTTP) may be utilized for machine-to-machine communication, more specifically for transferring machine readable file formats such as Extensible Markup Language (XML) and JavaScript Object Notation (JSON). A web service may be a system designed to support interoperable machine-to-machine interaction over a network.

At operation 702, the web service 376 of the VDI management services module 404(i) starts a detection process. At operation 704, the web service 376 listens on the particular port that is employed by the VDI systems 408(1) ... 408(i) ... 408(m) for communicating web service requests (e.g., information messages). In this example, the listener component 374 listens on port 55200.

At operation 706, the web service 376 determines whether an information message has been detected. As described supra, the information message is in the form of a web service request. The information message may be sent from any one of the VDI systems 408(1) ... 408(i) ... 408(m) by operations of that VDI system similar to the operations of the VDI system 408(1) described supra referring to FIG. 6. When the web service 376 has not detected an information message, the web service 376 goes back to operation 704. When the web service 376 detected an information message, the web service 376 extracts the destination unique key from the information message. The web service 376 further determines whether the destination unique key matches the its own unique key (i.e., the unique key configured for the VDI system 408(i)). When the destinations unique key does not match the unique key of the VDI system 408(i), the web service 376 determines that the information message is not directed to itself (i.e., VDI system 408(i)). Consequently, the web service 376 goes back to operation 704.

When the destination unique key matches the unique key of the VDI system 408(i), the web service 376 determines that the information message is directed to itself (i.e., the VDI system 408(i)) and enters operation 708. The web extracts the unique key, the host name, and the operation information from the information message. The web service 376 then stores the unique key, the host name, and the operation information in the data store 380 of the VDI management services module 404(i). More specifically, the web service 376 determines whether the extracted unique key has been stored in a data entry of the data store 380 already. If the unique key is in the data store 380 already, the web service 376 updates that data entry with the host name and operation information just extracted. If the unique key is not found in the data store 380, the web service 376 creates a new data entry in the data store 380, the data entry including the unique key, the host name, and the operation information extracted from the information message.

In this example, also referring to FIG. 4, the web service 376 of the VDI system 408(*i*) receives the information message 494 sent by the VDI system 408(1). The web service 376 extracts the unique key, the host name, and the operation information of the VDI system 408(1) from the information message 494 and then stores/updates them in the data store 380 of the VDI system 408(*i*). Similarly, the other ones of the VDI systems 408(1) . . . 408(*i*) . . . 408(*m*), upon receiving the discovery messages 492, may also send information messages including their respective unique keys, host names, and operation information to the web service 376 of the VDI system 408(*i*). The web service 376 similarly creates data entries in the data store 380 to store the received unique keys, host names, and operation information.

At operation 710, the web service 376 may send a web service response, in response to the received web service request (i.e., the information message), to the sender. In this example, in response to the information message 494 received from the VDI system 408(1), the VDI system 408(*i*) may send a web service response 496 to the listener component 374 of the VDI system 408(1), which sent the information message 494 to the VDI system 408(*i*). The web service response 496 may include the unique key, the host name, and the operation information of the VDI system 408(*i*). Upon receiving the web service response 496, the listener component 374 of the VDI system 408(1) may store the received unique key, host name, and operation information of the VDI system 408(*i*) in the data store 380 of the VDI system 408(1).

Figure 8:
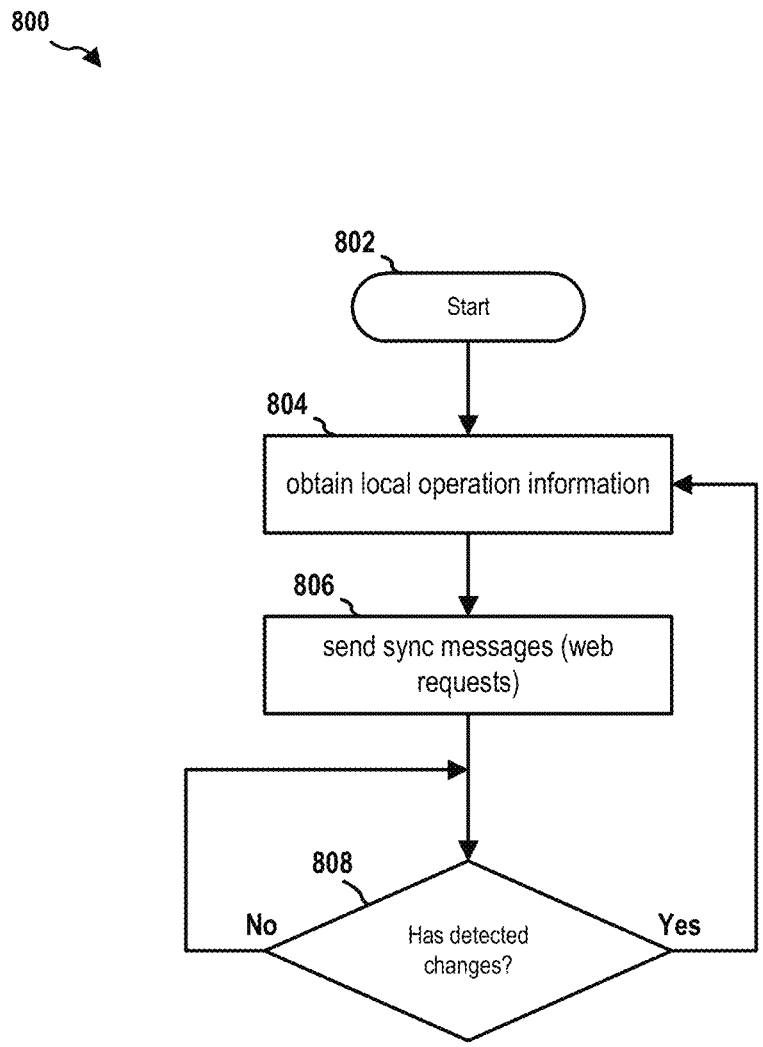
FIG. 8 is a flow chart of a method (process) for synchronizing operation information among VDI systems.

FIG. 8 is a flow chart 800 of a method (process) for synchronizing operation information among the VDI systems 408(1) . . . 408(*i*) . . . 408(*m*), using the VDI system 408(*i*) as an example. At operation 802, the configuration component 382 of the VDI system 408(*i*) starts a synchronization process. At operation 804, the configuration component 382 obtains the operation information of the VDI system 408(*i*) (i.e., local operation information).

At operation 806, the configuration component 382 obtains the host names, the unique keys, which are associated with the other VDI systems (i.e., the synchronized VDI systems), stored in the data store 380 of the VDI system 408(*i*). As such, the configuration component 382 can determine the VDI systems with which the VDI system 408(*i*) has synchronized operation information through the discovery mechanism described supra. For each of the synchronized VDI system, the VDI system 408(*i*) prepares a synchronization message (in the form of a web service request) including the unique key, the host name, the current operation information of the VDI system 408(*i*) as well as the unique key and the host name of the synchronized VDI system. The configuration component 382 sends the synchronization messages to the web service 376 of the synchronized VDI system.

In this example, the VDI system 408(*i*) and the VDI system 408(1) synchronize operation information with each other. Accordingly, the VDI system 408(*i*) sends a synchronization message 498 to the VDI system 408(1) on a predetermined port (e.g., port 55200). In particular, the port may be serviced or monitored by the web service 376 of the VDI system 408(1). Upon receiving the synchronization message 498, the web service 376 or configuration component 382 of the VDI system 408(1) can update the data entry in the data store 380 that contains the unique key, the host name, and the operation information of the VDI system 408(*i*).

At operation 808, the configuration component 382 determines whether the operation information of the VDI system 408(*i*) has changed. When the operation information has not changed, the configuration component 382 of the VDI system 408(*i*) goes back to the beginning of the operation 808. When the operation information has changed, the configuration component 382 goes back to operation 804 in order to send new synchronization messages.

Figure 9:
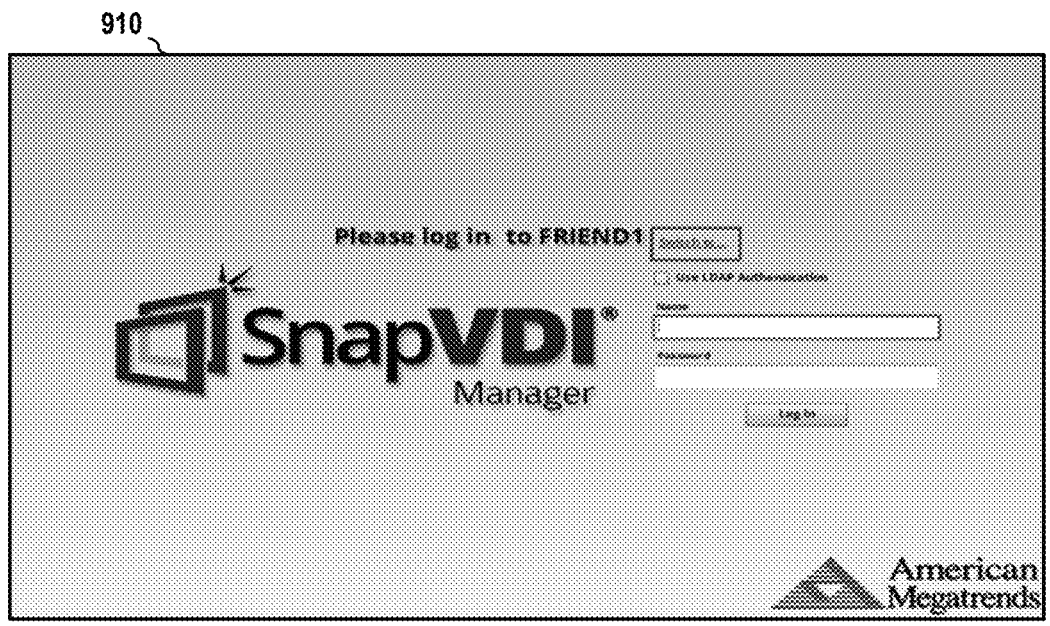
FIGS. 9(A) and 9(B) are diagrams illustrating a UI provided by a VDI manager.
Figure 9:

FIGS. 9(A) and 9(B) are diagrams illustrating a UI 910 provided by the VDI manager 406. The UI 910 may be configured to detect the VDI systems 408(1) . . . 408(*i*) . . . 408(*m*) (e.g., based on the discovery messages sent by the VDI systems 408(1) . . . 408(*i*) . . . 408(*m*)). Subsequently, the UI 910 may display a list of host names (and optionally network address) of the VDI systems 408(1) . . . 408(*i*) . . . 408(*m*) with which the VDI manager 406 may establish a connection. In this example, the VDI manager 406 shows three VDI systems: VDI A, VDI B, and VDI C. Through the UI 910, a user can select one of the VDI systems to connect.

Figure 10:
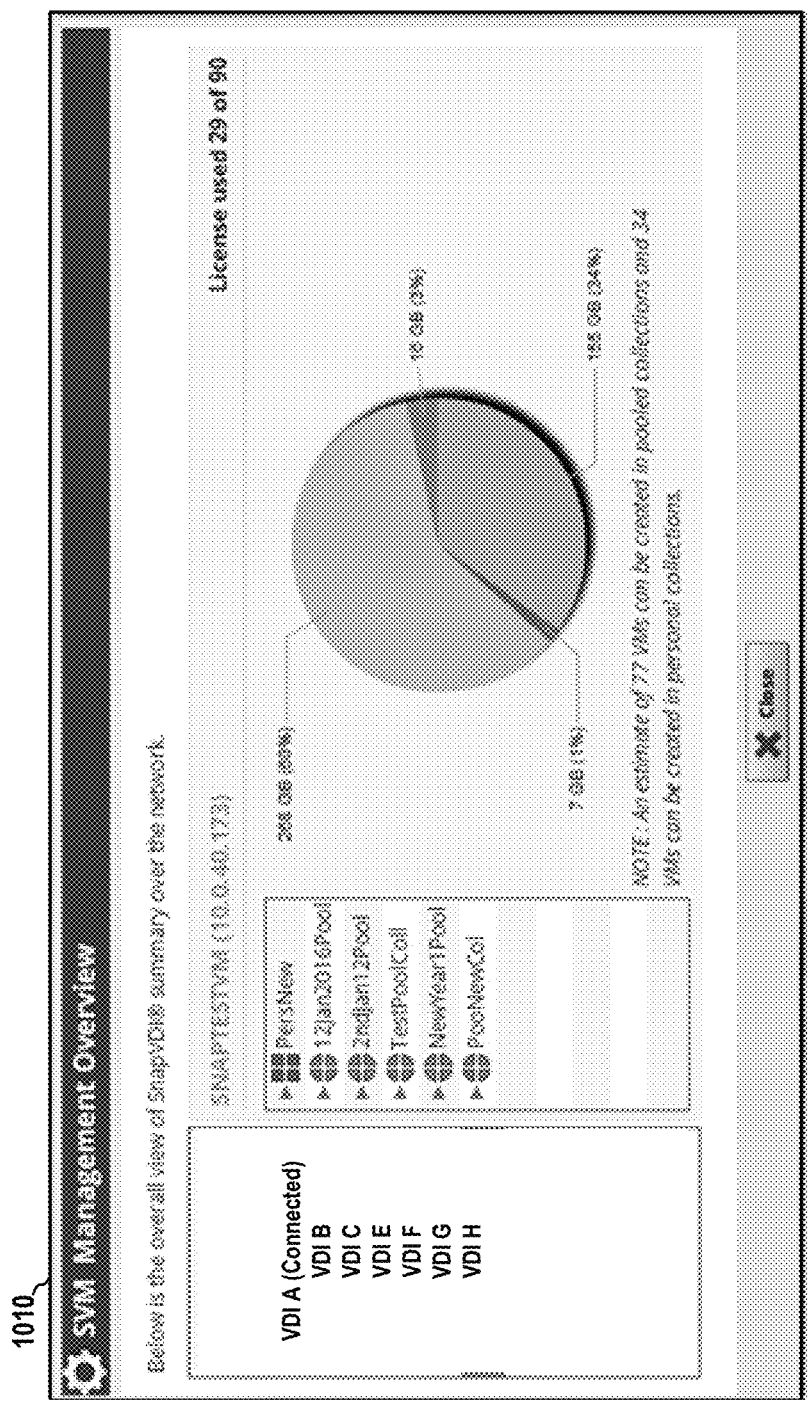
FIG. 10 is a diagram illustrating another UI provided by the VDI manager.

FIG. 10 is a diagram illustrating a UI 1010 provided by the VDI manager 406. This UI shows that a user has selected a particular VDI system (host name: VDI A) of the VDI systems 408(1) . . . 408(*i*) . . . 408(*m*) to connect. As described supra, the VDI systems 408(1) . . . 408(*i*) . . . 408(*m*) may synchronize operation information with each other. That is, the data store 380 of a particular VDI system may store operation information of the other VDI systems. In this example, in addition to its own operation information, the VDI A also stores operation information of VDI B to VDI H in the data store 380 of the VDI A. As such, the VDI manager 406 can obtain, from the VDI A, the operation information of the VDI B to VDI H. Accordingly, the VDI manager 406 can display operation information of all the synchronized VDI systems (i.e., from VDI A to VDI H).

Figure 11:
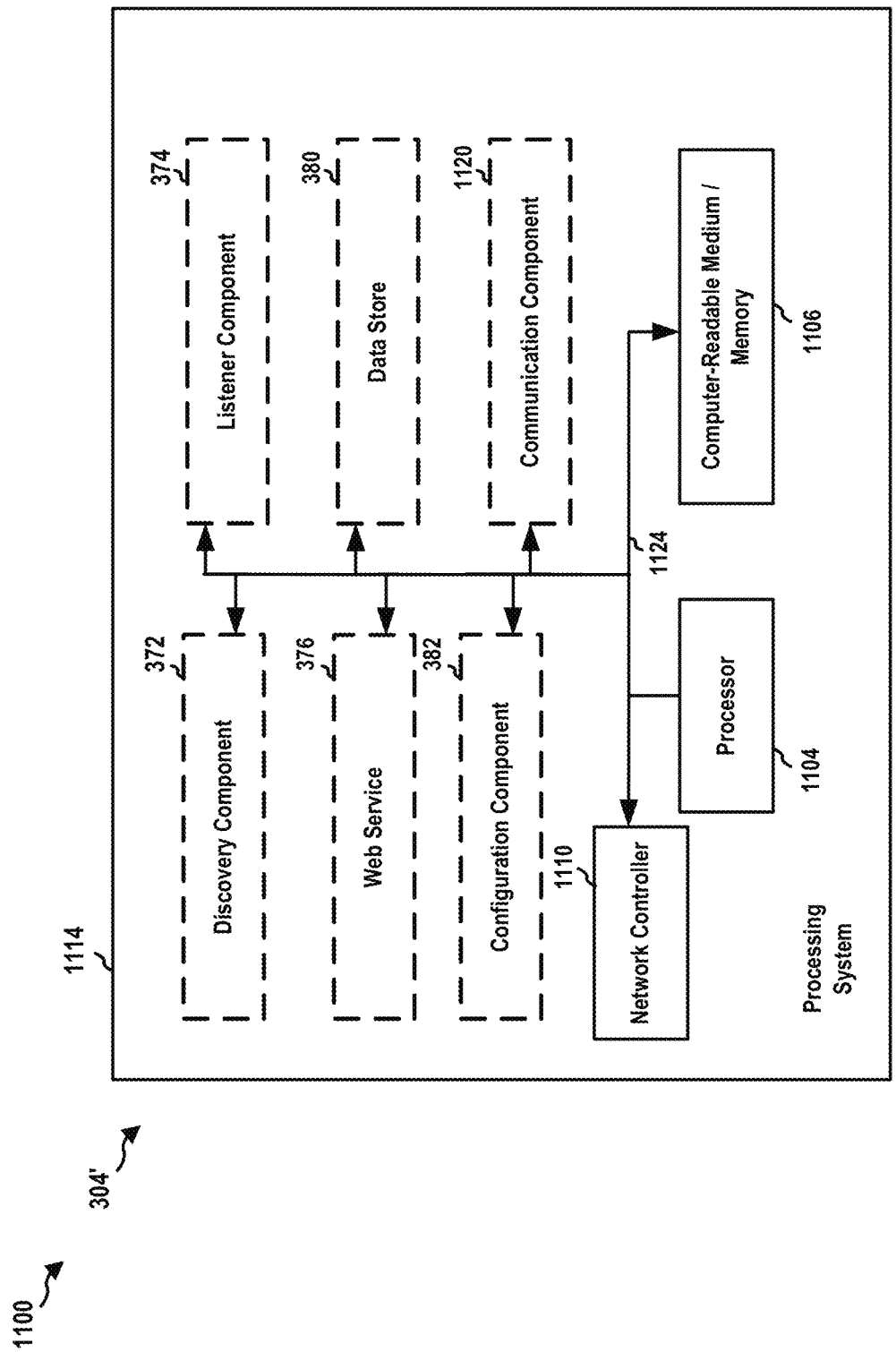
FIG. 11 is a diagram illustrating an example of a hardware implementation for an apparatus employing a processing system.

FIG. 11 is a diagram 1100 illustrating an example of a hardware implementation for an apparatus 304' (e.g., the VDI management services module 304) employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, including the processor 1104 the computer-readable medium/memory 1106, and the network controller 1110. The bus 1124 may also link various other circuits such as timing sources, peripherals, voltage regulators, and power management circuits, which are well known in the art, and therefore, will not be described any further.

The processing system 1114 may be coupled to a network controller 1110. The network controller 1110 provides a means for communicating with various other apparatus over a network. The network controller 1110 receives a signal from the network, extracts information from the received signal, and provides the extracted information to the processing system 1114, specifically the communication component 1120. In addition, the network controller 1110 receives information from the processing system 1114, specifically the communication component 1120, and based on the received information, generates a signal to be sent to the network. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the discovery component 372, the listener component 374, the web service 376, the data store 380, and the configuration component 382. The components may be software components running in the processor 1104, resident/stored in the computer readable medium/memory 1106, one or more hardware components coupled to the processor 1104, or some combination thereof.

The apparatus 304/304' may be configured to include means for performing each of the operations described supra referring to FIGS. 5-8. The aforementioned means may be one or more of the aforementioned components of the apparatus 304' and/or the processing system 1114 of the apparatus 304' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of managing a plurality of virtual desktop infrastructure (VDI) systems, comprising:

broadcasting or multicasting, at a first management service managing a first VDI system of the plurality of VDI systems, discovery messages periodically for discovering the first VDI system by other systems, each of the discovery messages including a first key uniquely associated with the first VDI system and a first network locator for locating the first VDI system in a network, the first VDI system including first plurality of collections of virtual machines;

receiving, from a second management service managing a second VDI system of the plurality of VDI systems, a web service request in response to the discovery messages, the web service request including the first key, a second key uniquely associated with the second VDI system, a second network locator for locating the second VDI system in the network, and second operation information of the second VDI system, the second VDI system including second plurality of collections of virtual machines (VMs), the second operation information specifying the second plurality of collections of VMs;

sending, at the first management service, a web service response including first operation information of the first VDI system to the second management service based on the second network locator, the first operation information specifying the first plurality of collections of VMs;

continuing, at the first management service, monitoring changes of the first operation information of the first VDI system; and resending, at the first management service, a web service response including the first operation information of the first VDI system to the second VDI system when the first operation information of the first VDI system has changed.

2. The method of claim 1, further comprising:

storing the second key, the second network locator, and the second operation information of the second VDI system in a data store of the first VDI system.

3. The method of claim 2, further comprising:

receiving, from a respective management service managing each of at least one additional VDI system, a respective web service request including a key uniquely associated with the each VDI system and a network locator for locating the each VDI system in a network; and storing, for each of the at least one additional VDI system, the key uniquely associated with the each VDI system and the network locator for locating the each VDI system in the data store of the first VDI system.

4. The method of claim 3, further comprising:

receiving, at the first management service, a request for operation information of a particular VDI system of the second VDI system and the at least one additional VDI system;

retrieving the operation information of the particular VDI system from the data store; and sending a response including the operation information of the particular VDI system.

5. The method of claim 4, further comprising:

determining, at the first management service, that the operation information of the first VDI system has changed; and sending, to each of the second management service and management services managing the at least one additional VDI system, a respective web service request including the changed operation information of the first VDI system.

6. The method of claim 5, further comprising:

retrieving a respective network locator of each of the second VDI system and the at least one additional VDI system from the data store, wherein the sending to each of the second VDI system and the at least one additional VDI system is based on the respective network locator of the each VDI system retrieved from the data store.

7. An apparatus for managing a plurality of virtual desktop infrastructure (VDI) systems, comprising:

a memory; and at least one processor coupled to the memory and configured to:

broadcast or multicast, at a first management service managing a first VDI system of the plurality of VDI systems, discovery messages periodically for discovering the first VDI system by other systems, each of the discovery messages including a first key uniquely associated with the first VDI system and a first network locator for locating the first VDI system in a network, the first VDI system including first plurality of collections of virtual machines;

receive, from a second management service managing a second VDI system of the plurality of VDI systems, a web service request in response to the discovery messages, the web service request including the first key, a second key uniquely associated with the second VDI system, a second network locator for locating the second VDI system in the network, and second operation information of the second VDI system, the second VDI system including second plurality of collections of virtual machines (VMs), the second operation information specifying the second plurality of collections of VMs;

send, at the first management service, a web service response including first operation information of the first VDI system to the second management service based on the second network locator, the first operation information specifying the first plurality of collections of VMs;

continue, at the first management service, monitoring changes of the first operation information of the first VDI system; and resend, at the first management service, a web service response including the first operation information of the first VDI system to the second VDI system when the first operation information of the first VDI system has changed.

8. The apparatus of claim 7, wherein the at least one processor is further configured to:

store the second key, the second network locator, and the second operation information of the second VDI system in a data store of the first VDI system.

9. The apparatus of claim 8, wherein the at least one processor is further configured to:

receive, from a respective management service managing each of at least one additional VDI system, a respective web service request including a key uniquely associated with the each VDI system and a network locator for locate the each VDI system in a network; and store, for each of the at least one additional VDI system, the key uniquely associated with the each VDI system and the network locator for locate the each VDI system in the data store of the first VDI system.

10. The apparatus of claim 9, wherein the at least one processor is further configured to:

receive, at the first management service, a request for operation information of a particular VDI system of the second VDI system and the at least one additional VDI system;

retrieve the operation information of the particular VDI system from the data store; and send a response including the operation information of the particular VDI system.

11. The apparatus of claim 10, wherein the at least one processor is further configured to:

determine, at the first management service, that the operation information of the first VDI system has changed; and send, to each of the second management service VDI system and management services managing the at least one additional, a respective web service request including the changed operation information of the first VDI system.

12. The apparatus of claim 11, wherein the at least one processor is further configured to:

retrieve a respective network locator of each of the second VDI system and the at least one additional VDI system from the data store, wherein the sending to each of the second VDI system and the at least one additional VDI system based on the respective network locator of the each VDI system retrieved from the data store.

13. A non-transitory computer-readable medium storing computer executable code for managing a plurality of virtual desktop infrastructure (VDI) systems, comprising code to:

broadcast or multicast, at a first management service managing a first VDI system of the plurality of VDI systems, discovery messages periodically for discovering the first VDI system by other systems, each of the discovery messages including a first key uniquely associated with the first VDI system and a first network locator for locating the first VDI system in a network, the first VDI system including first plurality of collections of virtual machines;

receive, from a second management service managing a second VDI system of the plurality of VDI systems, a web service request in response to the discovery messages, the web service request including the first key, a second key uniquely associated with the second VDI system, a second network locator for locating the second VDI system in the network, and second operation information of the second VDI system, the second VDI system including second plurality of collections of virtual machines (VMs), the second operation information specifying the second plurality of collections of VMs;

send, at the first management service, a web service response including first operation information of the first VDI system to the second management service based on the second network locator, the first operation information specifying the first plurality of collections of VMs;

continue, at the first management service, monitoring changes of the first operation information of the first VDI system; and resend, at the first management service, a web service response including the first operation information of the first VDI system to the second VDI system when the first operation information of the first VDI system has changed.

14. The non-transitory computer-readable medium of claim 13, wherein the code is further configured to:

store the second key, the second network locator, and the second operation information of the second VDI system in a data store of the first VDI system.

15. The non-transitory computer-readable medium of claim 14, wherein the code is further configured to:

receive, from a respective management service managing each of at least one additional VDI system, a respective web service request including a key uniquely associated with the each VDI system and a network locator for locate the each VDI system in a network; and store, for each of the at least one additional VDI system, the key uniquely associated with the each VDI system and the network locator for locate the each VDI system in the data store of the first VDI system.

16. The non-transitory computer-readable medium of claim 15, wherein the code is further configured to:

receive, at the first management service, a request for operation information of a particular VDI system of the second VDI system and the at least one additional VDI system;

retrieve the operation information of the particular VDI system from the data store; and send a response including the operation information of the particular VDI system.

17. The non-transitory computer-readable medium of claim 16, wherein the code is further configured to:

determine, at the first management service, that the operation information of the first VDI system has changed; and send, to each of the second management service and management services managing the at least one additional VDI system, a respective web service request including the changed operation information of the first VDI system.

* * * * *